United States Patent

Wang et al.

[11] Patent Number: 5,391,652
[45] Date of Patent: Feb. 21, 1995

[54] HIGH MOLECULAR WEIGHT EPOXY ESTER RESIN COMPOSITION, PROCESS THEREFOR AND COATING COMPOSITION

[75] Inventors: David S. Wang; Pong S. Sheih, both of Lake Jackson; Loan A. Ho, Houston; Charles M. Vetters, Lake Jackson, all of Tex.

[73] Assignee: The Dow Chemical Company, Midland, Mich.

[21] Appl. No.: 52,315

[22] Filed: Apr. 23, 1993

Related U.S. Application Data

[63] Continuation-in-part of Ser. No. 954,217, Sep. 30, 1992, abandoned.

[51] Int. Cl.6 .............................................. C08L 63/00
[52] U.S. Cl. ..................................... 525/533; 525/530; 525/423; 528/112; 528/111.3; 528/111.5
[58] Field of Search ........................ 525/533, 530, 423; 528/112, 111.3, 111.5

[56] References Cited

U.S. PATENT DOCUMENTS

| | | | |
|---|---|---|---|
| 2,698,308 | 12/1954 | Crecelius | 528/111.3 |
| 3,219,603 | 11/1965 | Scheibli et al. | 528/111.3 |
| 3,272,647 | 9/1966 | Swanson et al. | 428/416 |
| 3,280,056 | 10/1966 | Masters | 528/111.5 |
| 3,335,401 | 1/1967 | Kerns | 367/22 |
| 3,355,401 | 11/1967 | Tanner | 523/414 |
| 3,374,193 | 3/1968 | Tsatos et al. | 528/111.3 |
| 3,553,119 | 1/1971 | Wright | 528/111.3 |
| 3,816,365 | 6/1974 | Schmid et al. | 549/557 |
| 3,951,891 | 4/1976 | Topfl et al. | 525/514 |
| 3,975,322 | 8/1976 | Reinshagan et al. | 528/111.3 |
| 3,985,825 | 10/1976 | Schmid et al. | 549/557 |
| 4,017,432 | 4/1977 | Carey | 428/111.3 |
| 4,134,867 | 1/1979 | Topfl | 524/598 |
| 4,141,865 | 2/1979 | Bogan | 528/111.3 |
| 4,303,565 | 12/1981 | Tobias | 525/119 |
| 4,331,574 | 5/1982 | Bekooij et al. | 525/530 |
| 4,478,985 | 10/1984 | Bekooij et al. | 525/530 |
| 4,486,556 | 12/1984 | Kordomenos et al. | 525/528 |
| 4,661,562 | 4/1987 | Goel | 528/111.3 |
| 4,786,666 | 11/1988 | Cecil et al. | 523/427 |
| 4,952,645 | 8/1990 | Mulhaupt et al. | 525/438 |
| 5,124,406 | 6/1992 | Rolando et al. | 525/530 |
| 5,130,351 | 7/1992 | Golownia | 525/423 |
| 5,223,558 | 6/1993 | Ohba | 528/111.3 |

FOREIGN PATENT DOCUMENTS 569227  1/1959  Canada .
0129415 10/1980  Japan .
758146  6/1954  United Kingdom .

*Primary Examiner*—Melvyn I. Marquis
*Assistant Examiner*—Randy Gulakowski

[57] ABSTRACT

An epoxy ester resin which results from reacting (a) an epoxy resin, (b) a dimerized fatty acid and (c) a monocarboxylic acid. The epoxy ester resins are useful in coating compositions.

20 Claims, No Drawings

HIGH MOLECULAR WEIGHT EPOXY ESTER RESIN COMPOSITION, PROCESS THEREFOR AND COATING COMPOSITION

CROSS-REFERENCE TO RELATED APPLICATION

This application is a continuation-in-part of application Ser. No. 07/954,217, filed Sep. 30, 1992, now abandoned, which is incorporated herein by reference in its entirety.

FIELD OF THE INVENTION

The present invention relates to a composition of high molecular weight epoxy ester resin, a process for the preparation thereof and a curable composition comprising the epoxy ester resin.

BACKGROUND OF THE INVENTION

E. B. Tanner in U.S. Pat. No. 3,355,401 discloses the preparation of products from epoxy resins, polyfunctional acids and monofunctional acids by reacting them in such a manner that they obtained acid values from 30 to 90 mg KOH/gram. This was made possible by conducting the reaction such that the resultant product had an acid number in the range of 30–90 mg KOH/gm of product. These products, when employed in coating applications, result in undesirable coating performance having a deficiency in one or more properties such as poor flexibility, poor solvent resistance, poor water pasteurization resistance, and the like.

It would therefore be desirable to have available high molecular weight epoxy ester resins which have a high molecular weight and a narrow molecular weight distribution resin. By the term "high molecular weight" it is meant the weight average molecular weight is greater than 10,000. By the term "narrow molecular weight distribution" it is meant that the epoxy ester resin has a polydispersity value less than 10, preferably less than 6, more preferably less than 4. By the term "polydispersity" it is meant the value obtained when the weight average molecular weight (Mw) is divided by the number average molecular weight (Mn).

SUMMARY OF THE INVENTION

One aspect of the present invention pertains to an esterified epoxy resin having an acid number from zero to about 16, a polydispersity value of less than about 10 which results from reacting
(A) an epoxy resin having an epoxide equivalent weight of from 600 or 605 to about 15,000 being essentially free of castor oil polyglycidyl ether;
(B) a dimerized fatty acid having from about 10 to about 100 carbon atoms per molecule;
(C) optionally, a trimerized fatty acid having from 20 to about 150 carbon atoms per molecule; and
(D) a monocarboxylic acid; and
wherein components (A), (B), (C) and (D) are employed in amounts which provide a ratio of epoxide equivalents from component (A) to carboxylic acid equivalents from component (B) to carboxylic acid equivalents from component (C) to carboxylic acid equivalents from component (D) of $1:f:g:h$, wherein $f$ is the carboxylic acid equivalents from component (B) and has a value from about 0.1 to about 0.9, preferably from about 0.12 to about 0.75, more preferably from about 0.15 to about 0.55; $g$ is the carboxylic acid equivalents from component (C) and has a value from zero to about 0.1, preferably from zero to about 0.05, more preferably from about zero to about 0.02; and $h$ is the carboxylic acid equivalents from component (D) and has a value of from about 0.01 to about 0.9, preferably from about 0.05 to about 0.65, more preferably from about 0.1 to about 0.4; the value of $f+g+h$ is from about 0.11 to less than 0.99, preferably from about 0.2 to about 0.9, more preferably from about 0.35 to about 0.85; and $1.05 <$ average acid functionality $< 1.95$, preferably $1.2 <$ average acid functionality $< 1.9$, more preferably $1.3 <$ average acid functionality $< 1.85$, where average acid functionality is $((2f+3g+h)/(f+g+h))$.

Another aspect of the present invention pertains to a process for the preparation of esterified epoxy resins which comprises reacting at a temperature for a time suitable for producing an esterified epoxy resin having an acid number from zero to about 16, a composition comprising
(A) an epoxy resin having an epoxide equivalent weight of from 600 or 605 to about 15,000 being essentially free of castor oil polyglycidyl ether;
(B) a dimerized fatty acid having from about 10 to about 100 carbon atoms per molecule;
(C) optionally, a trimerized fatty acid having from 20 to about 150 carbon atoms per molecule; and
(D) a monocarboxylic acid; and
wherein components (A), (B), (C) and (D) are employed in amounts which provide a ratio of epoxide equivalents from component (A) to carboxylic acid equivalents from component (B) to carboxylic acid equivalents from component (C) to carboxylic acid equivalents from component (D) of $1:f:g:h$, wherein $f$ is the carboxylic acid equivalents from component (B) and has a value from about 0.1 to about 0.9, preferably from about 0.12 to about 0.75, more preferably from about 0.15 to about 0.55; $g$ is the carboxylic acid equivalents from component (C) and has a value from zero to about 0.1, preferably from zero to about 0.05, more preferably from about zero to about 0.02; and $h$ is the carboxylic acid equivalents from component (D) and has a value of from about 0.01 to about 0.9, preferably from about 0.05 to about 0.65, more preferably from about 0.1 to about 0.4; the value of $f+g+h$ is from about 0.11 to less than 0.99, preferably from about 0.2 to about 0.9, more preferably from about 0.35 to about 0.85; and $1.05 <$ average acid functionality $< 1.95$, preferably $1.2 <$ average acid functionality $< 1.9$, more preferably $1.3 <$ average acid functionality $< 1.85$, where average acid functionality is $((2f+3g+h)/(f+g+h))$.

Another aspect of the present invention pertains to a curable composition comprising the epoxy ester resin described above and a curing amount of a suitable curing agent therefor.

Another aspect of the present invention pertains to a coating composition comprising the curable composition described above.

Another aspect of the present invention pertains to the products or articles resulting from curing the aforementioned curable compositions.

A still further aspect of the present invention pertains to an object coated with the aforementioned coating composition which coating composition has subsequently been cured.

The present invention may suitably comprise, consist of, or consist essentially of, the aforementioned components.

The invention illustratively disclosed herein can suitably be practiced in the absence of any component which is not specifically disclosed or enumerated herein. Particularly, the compositions of the present invention are preferably free of monofunctional phenols or monofunctional phenolic compounds as well as being free of castor oil polyglycidyl ether compounds.

DETAILED DESCRIPTION OF THE INVENTION

Definitions

Acid number is the number of milligrams of potassium hydroxide which is neutralized by the free acid present in one gram of resin. The acid number is expressed as mg KOH/gm of esterified epoxy resin product.

Average acid functionality is $((2f+3g+h)/(f+g+h))$; where f is the acid equivalents contributed by the dimer acid, g is the acid equivalents contributed by the trimer acid and h is the acid equivalents contributed by the mono acid.

Polydispersity is the weight average molecular weight (Mw) divided by the number average molecular weight(Mn).

The esterified epoxy resins of the present invention are prepared by reacting a mixture of the epoxy resin (component (A)), dimerized fatty acid (component (B)), trimerized fatty acid (component (C)) and monocarboxylic acid (component (D)) at a temperature of from about 120° C. to about 280° C., preferably from about 150° C. to about 250° C., more preferably from about 170° C. to about 230° C. for a time sufficient to provide the reaction product with an acid number of from zero to about 16, preferably from about 0.01 to about 10, more preferably from about 0.1 to about 6.

The higher reaction temperatures require less time to produce the desired product than do the lower reaction temperatures. Particularly suitable reaction times range between about 0.01 to about 10, more suitably from about 0.1 to about 5, most suitably from about 0.5 to 3, hours.

At temperatures above 280° C., the product forms gels or decomposes.

At temperatures below about 120° C., the product does not advance to a high molecular weight.

When the acid number of the reaction product is greater than about 16, the product has a low molecular weight and coating properties, such as flexibility and solvent resistance are less than that which is desired.

The epoxy ester resins of the present invention usually have a weight average molecular weight (Mw) of from about 10,000 to about 200,000, preferably from about 15,000 to about 100,000, more preferably from about 18,000 to about 70,000.

The components are employed in amounts which provide a ratio of epoxide equivalents from component (A) to carboxylic acid equivalents from component (B) to carboxylic acid equivalents from component (C) to carboxylic acid equivalents from component (D) of 1:f:g:h, wherein f is the carboxylic acid equivalents from component (B) and has a value from about 0.1 to about 0.9, preferably from about 0.12 to about 0.75, more preferably from about 0.15 to about 0.55; g is the carboxylic acid equivalents from component (C) and has a value from zero to about 0.1, preferably from zero to about 0.05, more preferably from about zero to about 0.02; and h is the carboxylic acid equivalents from component (D) and has a value of from about 0.01 to about 0.9, preferably from about 0.05 to about 0.65, more preferably from about 0.1 to about 0.4; the value of f+g+h is from about 0.11 to less than 0.99, preferably from about 0.2 to about 0.9, more preferably from about 0.35 to about 0.85; and 1.05<average acid functionality<1.95, preferably 1.2<average acid functionality<1.9, more preferably 1.3<average acid functionality<1.85, where average acid functionality is $((2f+3g+h)/(f+g+h))$.

The esterified epoxy resins of the present invention usually have polydispersity values of less than about 10, preferably less than about 6, more preferably less than about 4 and usually have values from greater than 1 to less than about 10, more usually from greater than 1 to less than about 6, most usually from greater than 1 to less than about 4.

Epoxy Resins

Suitable epoxy resins which can be employed in the preparation of the esterified epoxy resins include, for example, the diglycidyl ethers of compounds containing an average of more than two, preferably not greater than about 2 aromatic, cycloaliphatic or aliphatic hydroxyl groups per molecule. Particularly suitable such epoxy resins can be represented by the following formulas Formula I (Diglycidyl Ethers of Cycloaliphatic Single Ring Compounds)

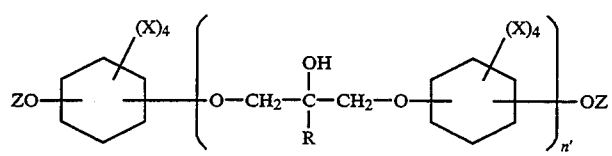

Formula II (Diglycidyl Ethers of Cycloaliphatic Two Ring Compounds)

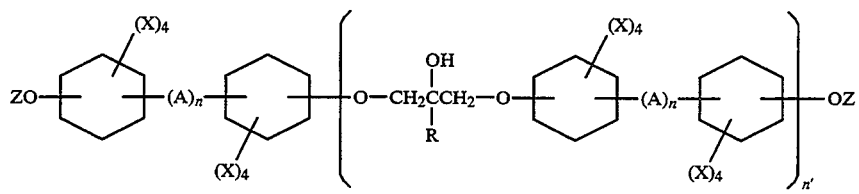

Formula III (Diglycidyl Ethers of Dihydric Single Ring Compounds)

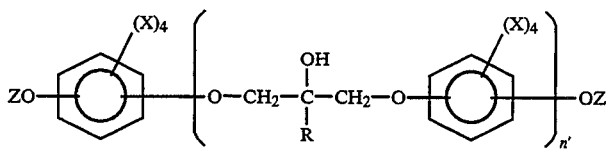

Formula IV (Diglycidyl Ethers of Dihydric Bisphenols)

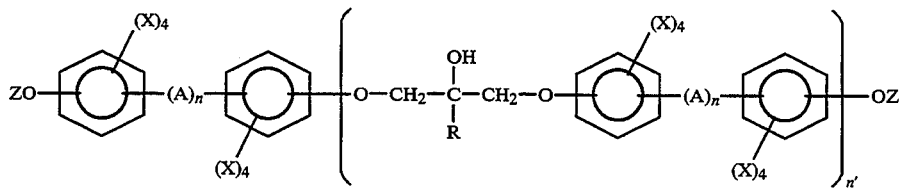

Formula V (Polyglycidyl ethers of Polyoxyalkylene Glycols)

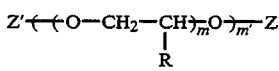

Formula VI (Diglycidyl Ethers of Aliphatic Diols)

ZO—Z"—OZ

Formula VII (Polyglycidyl ethers of Hydrocarbon Phenolic Resins)

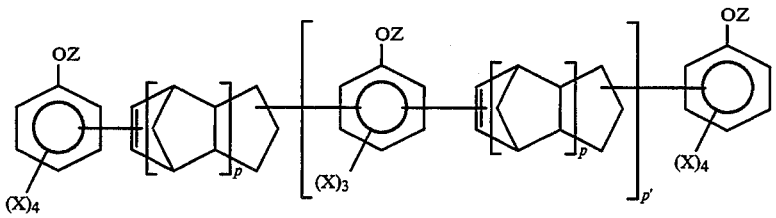

Formula VIII (Polyglycidyl Ethers of Novolac Resins)

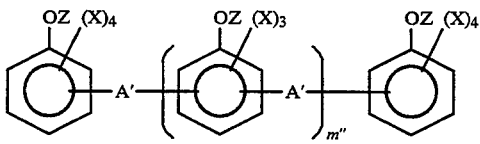

wherein each A is independently a divalent hydrocarbyl group having from 1 to about 12, preferably from 1 to about 8, more preferably from 1 to about 6 carbon atoms, —O—, —S—, S—S—, —SO$_2$—or —CO—; each R is independently hydrogen, methyl or ethyl; each X is independently hydrogen or a lower alkyl group having from 1 to about 4, preferably from 1 to about 2, carbon atoms, or a halogen, preferably chlorine or bromine; Z is a glycidyl group represented by the following formula

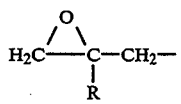

Z' is an m' valent aliphatic moiety; Z" is a divalent aliphatic moiety; m has a value from about 1 to about 20, preferably from about 1 to about 10, more preferably from about 1 to about 5, most preferably from about 1 to about 3; m' has a value from 2 to about 8, more preferably from about 2 to about 4, most preferably from about 2 to about 3; m" has an average value from 0.01 to about 10, preferably from about 0.01 to about 5, more preferably from about 0.01 to about 3; n has a value of zero or 1; n' has an average value from 5 to about 60, preferably from about 10 to about 50, more preferably from about 20 to about 40; p has an average value from zero to about 6, preferably from about 0 to about 4, more preferably from about 0 to about 2; and p' has an average value from about 0 to about 20, preferably from about 0 to about 10, more preferably from about 0 to about 5.

The term "hydrocarbyl" employed herein means an aromatic, aliphatic, or cycloaliphatic group, having from 1 to about 12, preferably from 1 to about 8, more preferably from 1 to about 4 carbon atoms. The aliphatic and cycloaliphatic groups can be saturated or unsaturated. These hydrocarbyl groups are monovalent or divalent as required.

These epoxy resins usually have an epoxide equivalent weight from 600 or 605 to about 15,000, preferably from about 750 to about 8,000, more preferably from about 900 to about 5,000, and a weight average molecular weight from about 1,000 to about 100,000, preferably from about 2,000 to about 80,000, more preferably from about 5,000 to about 50,000.

Particularly suitable epoxy resins include, for example, the epoxy resins represented by Formula II wherein A is an isopropylidene, —CH$_2$—, —O—, —S—, —CO— or —SO$_2$— group; R is hydrogen; each X is hydrogen, chlorine or bromine; n is 1 and n' has an average value from 5 to about 60, preferably from about 10 to about 50, most preferably from about 20 to about 40.

Dimerized Fatty Acid

The dimerized fatty acid, component (B) employed in the present invention suitably has two carboxyl groups and from about 10 to about 100, more suitably from about 20 to about 60, most suitably from about 24 to about 48 carbon atoms per molecule. The dimerized fatty acid may also contain a small amount of monomeric fatty acid (one carboxylic acid group per molecule) and/or trimer acid (three carboxylic acid groups per molecule). Such small amounts can range from about 0 to about 10, preferably from about 0 to about 5, more preferably from about 0 to about 3 percent by weight based upon the amount of the dimerized fatty acid. These amounts are the total combined amount of the monomeric and trimeric fatty acid components in the dimerized fatty acid component. The amount of the monomeric fatty acid counts toward the amount of monocarboxylic acid employed as component (C) employed in the preparation of the epoxy ester resin of the present invention. The amount of the trimerized fatty acid counts toward the ratio of carboxyl groups per epoxide group ratio employed in the preparation of the present invention.

The dimerized fatty acids are the addition products of ethylenically unsaturated monocarboxylic acids prepared by the addition polymerization of ethylenically unsaturated monocarboxylic acids having from about 5 to about 50, preferably from about 10 to about 30 more preferably from about 12 to about 24 carbon atoms per molecule.

The dimerized fatty acids can be modified by the modification agent prior to the reaction with epoxy resin. Suitable modification agents which can be employed herein include, for example, amine, glycol, isocyanate, and any combination thereof.

Particularly suitable dimeric fatty acids which are employed in the present invention include, for example, C$_{36}$ dibasic acid, C$_{44}$ dibasic acid, polyamide dicarboxylic acid or any combination thereof.

Trimerized Carboxylic Fatty Acid

The trimerized fatty carboxylic acids are not normally added to the formulation intentionally. They are inherently included via commercial grades of dimerized fatty acids which in some instances contain trimerized fatty acids as an impurity in small amounts.

Monocarboxylic Acid

Suitable monocarboxylic acids which can be employed herein include, those containing from 1 to about 50, more suitably from about 2 to about 36, most suitably from about 4 to about 28 carbon atoms per molecule and one carboxylic acid per molecule.

Particularly suitable monocarboxylic acids which can be employed herein include, for example, stearic acid, butyric acid, caproic acid, caprylic acid, capric acid, lauric acid, lauroleic acid, myristic acid, myristoleic acid, palmitic acid, palmitoleic acid, oleic acid, Ricinoleic acid, linoleic acid, linolenic acid, eleostearic acid, licanic acid, arachidic acid, gadoleic acid, arachidonic acid, behenic acid, erucic acid, clupanodonic acid, lignoceric acid, nisinic acid, cerotic acid, montanic acid.

Solvents

If desired, the reaction between the epoxy compound and the acid compounds can be conducted in the presence of one or more suitable solvents such as, for example glycol ethers, alcohols, ketones, acetates, aromatic hydrocarbons, any combination thereof and the like. Particularly suitable solvents include, for example, acetone, methyl ethyl ketone, methyl isobutyl ketone, methyl amyl ketone, cyclohexanone, diacetone alcohol, n-methyl ether of ethylene glycol, methyl ether of ether of ethylene glycol, n-butyl ether of propylene glycol, methyl ether of propylene glycol, n-butyl ether of diethylene glycol, methyl ether of diethylene glycol, n-butyl ether of dipropylene glycol, methyl ether of dipropylene glycol, 3-methyl- 3-methoxy butanol, n-butanol, sec-butanol, isopropanol, butyl acetate, toluene, xylene, or any combination thereof and the like.

The solvents, when employed, are employed in amounts of from about 0.1 to about 30, preferably from about 0.5 to about 15, more preferably from about 1 to about 10, per cent by weight based upon the combined weight of the reactants.

Catalysts

If desired, the reaction between the epoxy compound and the acid compounds can be conducted in the presence of one or more suitable catalysts such as, for example, those represented by the general formula

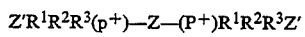

wherein each $R^1$, $R^2$ and $R^3$ is independently an aromatic or aliphatic or cycloaliphatic group or is an inertly substituted aromatic or aliphatic or cycloaliphatic group; Z is —(C(R$^4$)$_2$)$_a$—; each $R^4$ is independently hydrogen or a hydrocarbyl group or inertly substituted hydrocarbyl group containing from 1 to about 20, more suitably from 1 to about 10, most suitably from 1 to about 4 carbon atoms; Z' is any suitable anion and a has a value of at least 4, suitably from about 4 to about 20, more suitably from about 4 to about 10, most suitably from 4 to about 6. The term "hydrocarbyl" is as herein before defined. The term "inertly substituted hydrocarbyl group" means that the hydrocarbyl group can contain one or more substituent groups that does not enter into the reaction and does not interfere with the reaction between the epoxy compound and the compound with which it is being reacted. Suitable such inert groups include, for example, —CO, —Cl, —C≡N, and —OH.

Also suitable are phosphonium compounds which have three phenyl or toll groups attached to the phosphorus atom and one cycloalkyl group attached to the phosphorus atom. Quaternary ammonium compounds such as benzyl trimethyl ammonium chloride are preferred, although the other well known compounds capable of catalyzing an epoxy-carboxyl reaction can also be used such as pyridine, piperidine, benzyl trimethyl ammonium acetate, and the like.

The catalysts, when employed, are employed in amounts of from about 0.01 to about 0.5, preferably from about 0.05 to about 0.3, more preferably from about 0.08 to about 0.2, per cent by weight based upon the combined weight of the reactants.

Curing Agents

Suitable curing agents which can be employed herein include, for example, phenol-aldehyde resole resins, urea-aldehyde resins, melamine-aldehyde resins, polyamides, acid anhydrides, primary, secondary and tertiary amines, imidazoles and guanadines any combination thereof. Particularly suitable curing agents include, for example, melamine-formaldehyde resins, phenolformaldehyde resole resins, urea-formaldehyde resins, polyamides and any combination thereof.

The curing agents are employed in amounts which are sufficient to satisfactorily cure the composition. Usually suitable amounts include from about 1 to about 50, more suitably from about 3 to about 30, most suitably from about 5 to about 25, moles of curing agent per epoxide group is sufficient to cure the composition.

The esterified epoxy resins of the present invention can be formed into any shape desired upon exiting from the reaction kettle by any suitable means. For example, the resin may be chopped into pellets; flaked into flakes; ground into particles; formed into sheets, pastilles, or films; or any combination thereof. The coating compositions of the present invention can contain, in addition to the advanced epoxy resin, solvent and curing agents, fillers, pigments, dyes, flow control agents, leveling agents, antioxidants, and the like. These additional additives are employed in functionally equivalent amounts, i.e. the amount which is suitable to produce the desired effect. Those skills in the coating art know the suitable amounts in which these additives are employed.

The coating compositions of the present invention can be applied to such substrates as tin, steel, aluminum, wood, plastic, paper, and the like.

The following examples are illustrative of the invention, but are not to be construed as to limiting the scope thereof in any manner.

The following raw materials are employed in the examples and comparative experiments.

Epoxy Resin A is a diglycidyl ether of bisphenol A having an epoxide equivalent weight of 180.2 commercially available from The Dow Chemical Company as D.E.R. TM 383.

Epoxy Resin B is an advanced epoxy resin prepared by reacting diglycidyl ether of bisphenol A with bisphenol A which advanced epoxy resin has an EEW of 919.5 and a Mw of 4,348 and is commercially available from The Dow Chemical Company as D.E.R. TM 664.

Epoxy Resin C is a diglycidyl ether of dipropylene glycol having an EEW of 190 available from The Dow Chemical Company as D.E.R. TM 736.

Epoxy Resin D is an advanced epoxy resin prepared by reacting diglycidyl ether of bisphenol A with bisphenol A which advanced epoxy resin has an EEW of 1,767 and a Mw of 7,835 and is commercially available from The Dow Chemical Company as D.E.R. TM 667.

Epoxy Resin E is an advanced epoxy resin prepared by reacting diglycidyl ether of bisphenol A with bisphenol A which advanced epoxy resin has an EEW of 4,772 and a Mw of 20,050 and is commercially available from The Dow Chemical Company as D.E.R. TM 669E.

Epoxy Resin F is an advanced epoxy resin prepared by reacting diglycidyl ether of bisphenol A with bisphenol A which advanced epoxy resin has an EEW of 462 and a Mw of 1,975 and is commercially available from The Dow Chemical Company as D.E.R. TM 661.

Dimerized Fatty Acid A is a $C_{36}$ dibasic acid having an acid equivalent weight of 282.2 commercially available from Emory Industries as Empol TM 1061. This product contains 2% monobasic acid, 96% dibasic acid and 2% polybasic acid.

Dimerized Fatty Acid B is a $C_{36}$ dibasic acid having an acid equivalent weight of 281.9 commercially available from Henkel Corporation as Versadyme TM 288. This product contains 1% monobasic acid and 97% dibasic acid.

Dimerized Fatty Acid C is $C_{36}$ dibasic acid having an acid equivalent weight of 282.6 commercially available from Emory Industries as Empol TM 1020. This product contains 12% monobasic acid, 77% dibasic acid and 11% polybasic acid.

Dimerized Fatty Acid D is $C_{44}$ dibasic acid having an acid equivalent weight Of 348.5 commercially available from Unichema International as Pripol TM 1004. This product contains 0.1% C22 monomer, 4% C36+intermediate, 95% C44 dimer and 1% C66 trimer.

Dihydroxyl Containing Compound A is a highly purified bisphenol A commercially available from The Dow Chemical Company as Parabis TM.

Catalyst A is ethyltriphenyl phosphonium acetate.acetic acid complex as a 70% by weight solution in methanol.

Solvent A is a complex mixture of petroleum hydrocarbons consisting predominately $C_8$ to $C_{10}$ aromatic hydrocarbons commercially available from Exxon Company as Aromatic 100.

Curing Agent A is a phenol-formaldehyde resin commercially available from General Electric as Methylon TM 75108.

Curing Agent B is a urea-formaldehyde resin commercially available from Reichhold Chemicals, Inc. as Beckamine TM 21-510.

Curing Agent C is a melamine-formaldehyde resin commercially available from American Cyanamid Company as Cymel TM 325.

EXAMPLE 1

A. Preparation of Advanced Epoxy Resin

Epoxy resin A (130.65 grams, 0.724 equivalent), Dihydroxyl containing compound A (69.35 grams, 0.608 equivalent), and 0.222 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 1,792 and a weight average molecular weight (Mw) of 10,760.

B. Preparation of Epoxy Ester Resin

Stearic acid (9.08 grams, 0.0320 equivalent), Dimerized acid A (11.88 grams, 0.0421 equivalent), and 0.07 grams of Catalyst A are added into the resin kettle to react with the advanced epoxy resin. The contents are heated to a temperature of 195° C. for additional 1 hour. A clear high molecular weight epoxy ester resin is obtained. The final product is taken and analysis reveals it to have an EEW of 6,573, a Mw of 24,950, a polydispersity of 2.902, and an acid number of 1.0 mg KOH/gm.

C. Preparation of Coating Composition

A 30 grams of the epoxy ester resin prepared in this example was dissolved in 70 grams of solvent mixture.

The solvent mixture consisted of 35 weight percent of ethylene glycol monobutyl ether, 20 weight percent of cyclohexanone, 25 weight percent of Solvent A, and 20 weight percent of xylene. 25 grams of phenol-formaldehyde resin (30% solids solution) is blended with the epoxy ester resin solution. The mixture is homogenized for 4 hours at a temperature of 110° C. After cooling to ambient temperature, the resultant coating composition is applied to tin-free steel panels via a wire wound bar and cured in an oven at 210° C. for 10 minutes.

EXAMPLE 2

A. Preparation of Advanced Epoxy Resin

Epoxy Resin A (129.58 grams, 0.718 equivalent), bisphenol A (70.42 grams, 0.618 equivalent), and 0.222 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 2,105 and a Mw of 13,310.

B. Preparation of Epoxy Ester Resin

Stearic acid (7.50 grams, 0.0264 equivalent), dimerized fatty acid B (7.50 grams, 0.0266 equivalent), and 0.07 grams of catalyst are added into the resin kettle to react with the advanced epoxy resin. The contents are heated to a temperature of 195° C. for additional 1 hour. A clear high molecular weight epoxy ester resin is obtained. The final product is taken and analysis reveals it to have an EEW of 3,486, a Mw of 15,750, a polydispersity of 3.200, and an acid number of 1.4 mg KOH/gm.

C. Preparation of Coating Composition

A coating is prepared as described in Example 1-C. The properties of the coating prepared from the advanced epoxy ester resin produced in Example 2 are given in Table II.

EXAMPLE 3

A. Preparation of Advanced Epoxy Resin

Epoxy Resin A (127.76 grams, 0.708 equivalent), dihydroxyl containing compound A (72.24 grams, 0.634 equivalent), and 0.222 grams of Catalyst A are added to a 1 liter resin kettle equipped with a means for stirring, nitrogen purge, and temperature control. The contents are heated with stirring to a temperature of 170° C. over a period of 30 minutes. A sample was taken and an analysis reveals the advanced epoxy resin to have an EEW 2,608 and a Mw of 15,451.

B. Preparation of Epoxy Ester Resin

Stearic acid (4.00 grams, 0.0141 equivalent), Dimerized Fatty Acid B (4.00 grams, 0.0142 equivalent), and 0.07 grams of Catalyst A are added into the resin kettle to react with the advanced epoxy resin. The contents are heated to a temperature of 195° C. for additional 1 hour. A clear high molecular weight epoxy ester resin is obtained. The final product is taken and analysis reveals it to have an EEW of 5,673, a Mw of 34,780, a polydispersity of 3.181, and an acid number of 0.3 mg KOH/gm.

C. Preparation of Coating Composition

A coating is prepared as described in Example 1-C. The properties of the coating prepared from the advanced epoxy ester resin produced in Example 3 are given in Table II.

EXAMPLE 4

A. Preparation of Advanced Epoxy Resin

Epoxy Resin A (129.58 grams, 0.718 equivalent), Dihydroxyl Containing Compound A (70.42 grams, 0.618 equivalent), and 0.222 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 2,046 and a Mw 12,250.

B. Preparation of Epoxy Ester Resin

Stearic acid (3.75 grams, 0.0132 equivalents), Dimerized Fatty Acid B (11.25 grams, 0.0399 equivalents), and 0.07 grams of Catalyst A are added into the resin kettle to react with the advanced epoxy resin. The contents are heated to a temperature of 195° C. for additional 1 hour. A clear high molecular weight epoxy ester resin is obtained. The final product is taken and analysis reveals it to have an EEW of 4,768, a Mw 25,680, a polydispersity of 2.950, and an acid number of 0.4 mg KOH/gm.

C. Preparation of Coating Composition

A coating is prepared as described in Example 1-C. The properties of the coating prepared from the advanced epoxy ester resin produced in Example 4 are given in Table II.

EXAMPLE 5

A. Preparation of Advanced Epoxy Resin

Epoxy Resin A (131.57 grams, 0.729 equivalents), Dihydroxyl Containing Compound A (68.43 grams, 0.600 equivalents), and 0.222 grams of Catalyst A are added to a 1 liter resin kettle equipped with a means for stirring, nitrogen purge, and temperature control. The contents are heated with stirring to a temperature of 170° C. over a period of 30 minutes. A sample was taken and an analysis reveals the advanced epoxy resin to have an EEW of 1,641 and a Mw of 9,665.

B. Preparation of Epoxy Ester Resin

Stearic acid (6.38 grams, 0.0225 equivalent), Dimerized Fatty Acid A (18.54 grams, 0.0657 equivalent), and 0.07 grams of Catalyst A are added into the resin kettle to react with the advanced epoxy resin. The contents are heated to a temperature of 195° C. for additional 1 hour. A clear high molecular weight epoxy ester resin is obtained. The final product is taken and analysis revealed it to have an EEW of 8,058, a Mw of 57,910, a polydispersity of 5.385, and an acid number of 1.6 mg KOH/gm.

B. Preparation of Coating Composition

A coating is prepared as described in Example 1-C. The properties of the coating prepared from the advanced epoxy ester resin produced in Example 5 are given in Table II.

EXAMPLE 6

A. Preparation of Advanced Epoxy Resin

Epoxy Resin A (132.24 grams, 0.733 equivalent), Dihydroxyl Containing Compound A (67.76 grams, 0.594 equivalent), and 0.17 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 1,513 and a Mw of 8,920.

B. Preparation of Epoxy Ester Resin

Stearic acid (7.12 grams, 0.0251 equivalent), Dimerized fatty acid A (17.32 grams, 0.0614 equivalent), and 0.07 grams of Catalyst A are added into the resin kettle to react with the advanced epoxy resin. The contents are heated to a temperature of 195° C. for additional 1 hour. A clear high molecular weight epoxy ester resin is obtained. The final product is taken and analysis reveals it to have an EEW of 5,829, a Mw of 30,495, a polydispersity of 3.418, and an acid number of 0.9 mg KOH/gm.

C. Preparation of Coating Composition

A coating is prepared as described in Example 1-C. The properties of the coating prepared from the advanced epoxy ester resin produced in Example 6 are given in Table II.

EXAMPLE 7

A. Preparation of Advanced Epoxy Resin

Epoxy Resin A (134.88 grams, 0.747 equivalent), Dihydroxyl Containing Compound A (65.12 grams, 0.571 equivalent), and 0.17 grams of Catalyst A are added to a 1 liter resin kettle equipped with a means for stirring, nitrogen purge, and temperature control. The contents are heated with stirring to a temperature of 170° C. over a period of 30 minutes. A sample as taken and an analysis reveals the advanced epoxy resin to have an EEW 1,212 and a Mw of 7,070.

B. Preparation of Epoxy Ester Resin

Stearic acid (5.26 grams, 0.0185 equivalent), Dimerized fatty acid A (27.60 grams, 0.0979 equivalent), and 0.07 grams of Catalyst A are added into the resin kettle to react with the advanced epoxy resin. The contents are heated to a temperature of 195° C. for additional 1.5 hour. A clear high molecular weight epoxy ester resin is obtained. The final product is taken and analysis reveals it to have an EEW of 4,926, a Mw of 34,710, a polydispersity of 3.676, and an acid number of 1.6 mg KOH/gm.

C. Preparation of Coating Composition

A coating is prepared as described in Example 1-C. The properties of the coating prepared from the advanced epoxy ester resin produced in Example 7 are given in Table II.

EXAMPLE 8

A. Preparation of Epoxy Ester Resin

Epoxy Resin B (183.90 grams, 0.200 equivalent), Dimerized Fatty Acid B (28.22 grams, 0.1000 equivalent), stearic acid (8.00 grams, 0.0282 equivalents), and 0.14 grams Catalyst A are added to a 1.0 liter resin kettle equipped with a means for stirring, nitrogen purge, and temperature control. The contents are heated with stirring to a temperature of 195° C. over a period of 3 hours. A clear high molecular weight epoxy ester resin is prepared. A sample is taken and an analysis reveals it to have an EEW of 4,614, a Mw of 41,638, a polydispersity of as 9.227, and an acid number of 1.9 mg KOH/mg.

B. Preparation of Coating Composition

A coating is prepared as described in Example 1-C. The properties of the coating prepared from the advanced epoxy ester resin produced in Example 8 are given in Table II.

EXAMPLE 9

A. Preparation of Advanced Epoxy Resin

Epoxy Resin A (483.00 grams, 2.675 equivalent), Dihydroxyl Containing Compound A (262.99 grams, 2.307 equivalent), and 0.8287 grams of Catalyst A are added to a 2 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 1,842 and a Mw of 10,070.

B. Preparation of Epoxy Ester Resin

C1298 Lauric acid from Procter & Gamble Company (8.40 grams, 0.042 equivalent), Dimerized Fatty Acid A (42.00 grams, 0.1489 equivalent), and 0.18 grams of Catalyst A are added into the resin kettle to react with the advanced epoxy resin. The contents are heated to a temperature of 195° C. for an additional 1.5 hours. A clear high molecular weight epoxy ester resin is obtained. The final product is taken and analysis reveals it to have an EEW of 3,509, a Mw of 15,554, a polydispersity of 2.274, and an acid number of 1.0 mg KOH/gm.

C. Preparation of Coating Composition

A coating is prepared as described in Example 1-C. The properties of the coating prepared from the advanced epoxy ester resin produced in Example 9 are given in Table II.

EXAMPLE 10

A. Preparation of Epoxy Ester Resin

Epoxy Resin A (132.24 grams, 0.732 equivalent), Dihydroxyl Containing Compound A (67.76 grams, 0.594 equivalent), and 0.22 grams of Catalyst A are added to a 1 liter resin kettle to target the advanced resin to reach an EEW of 1448, a Mw of 8,250. Stearic acid (7.12 grams, 0.0251 equivalents) and Dimerized Fatty Acid A (17.32 grams, 0.0614 equivalents) are also added into the resin kettle. The resin kettle is equipped with means for stirring, nitrogen purge, and temperature control. The contents are heated with stirring to a temperature of 195° C. over a period of 1.5 hours. A clear high molecular weight epoxy ester resin is obtained. The final product is taken and analysis reveals it to have an EEW of 4,702, an Mw of 27,160, a polydispersity of 3.899, and an acid number of 0.8 mg KOH/gm.

B. Preparation of Coating Composition

A coating is prepared as described in Example 1-C. The properties of the coating prepared from the advanced epoxy ester resin produced in Example 10 are given in Table II.

EXAMPLE 11

A. Preparation of Advanced Epoxy Resin

Epoxy Resin A (129.58 grams, 0.718 equivalent), Dihydroxyl Containing Compound A (70.42 grams, 0.618 equivalent), and 0.2221 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 2,049 and a Mw of 12,180.

B. Preparation of Epoxy Ester Resin

Stearic acid (10.00 grams, 0.0352 equivalent), Dimerized Fatty Acid C (5.00 grams, 0.0178 equivalent), and 0.07 grams of Catalyst A are added into the resin kettle to react with the advanced epoxy resin. The contents are heated to a temperature of 195° C. for additional 1 hour. A dear high molecular weight epoxy ester resin is obtained. The final product is taken and analysis reveals it to have an EEW of 5,873, a Mw of 19,364, a polydispersity of 2.837, and an acid number of 1.2 mg KOH/gm.

C. Preparation of Coating Composition

A coating is prepared as described in Example 1-C. The properties of the coating prepared from the advanced epoxy ester resin produced in Example 11 are given in Table II.

EXAMPLE 12

A. Preparation of Advanced Epoxy Resin

Epoxy resin A (112.40 grams, 0.622 equivalent), Epoxy Resin C (20.17 grams, 0.106 equivalent), Dihydroxyl Containing Compound A (67.76 grams, 0.594 equivalent), and 0.2221 grams of Catalyst A are added to a 1 liter resin kettle equipped with a means for stirring, nitrogen purge, and temperature control. The contents are heated with stirring to a temperature of 170° C. over a period of 1 hour. A sample is taken and an analysis reveals the advanced epoxy resin to have an EEW of 1,526 and a Mw of 8,486.

B. Preparation of Epoxy Ester Resin

Stearic acid (6.00 grams, 0.0211 equivalent), Dimerized Fatty Acid A (18.40 grams, 0.0652 equivalent), and 0.07 grams of Catalyst A are added into the resin kettle to react with the advanced epoxy resin. The contents are heated to a temperature of 195° C. for additional 1.5 hour. A clear high molecular weight epoxy ester resin is obtained. The final product is taken and analysis reveals it to have an EEW of 5,619, a Mw of 22,631, polydispersity of 2.659, and an acid number of 0.8 mg KOH/gm.

C. Preparation of Coating Composition

A coating is prepared as described in Example 1-C. The properties of the coating prepared from the advanced epoxy ester resin produced in Example 12 are given in Table II.

EXAMPLE 13

A. Preparation of Advanced Epoxy Resin

Epoxy Resin A (92.57 grams, 0.513 equivalent), Epoxy Resin C (40.34 grams, 0.212 equivalent), Dihydroxyl Containing Compound A (67.76 grams, 0.594 equivalents), and 0.2221 grams of Catalyst A are added to a 1 liter resin kettle equipped with a means for stirring, nitrogen purge, and temperature control. The contents are heated with stirring to a temperature of 170° C. over a period of 1 hour. A sample is taken and an analysis reveals the advanced epoxy resin to have an EEW of 1,547 and a Mw of 6,525.

B. Preparation of Epoxy Ester Resin

Stearic acid (6.00 grams, 0.0211 equivalent), Dimerized Fatty Acid A (18.40 grams, 0.0652 equivalent), and 0.07 grams of catalyst A are added into the resin kettle to react with the advanced epoxy resin. The contents are heated to a temperature of 195° C. for additional 1.5 hour. A clear high molecular weight epoxy ester resin is obtained. The final product is taken and analysis reveals it to have an EEW of 6,017, a Mw of 15,345, a polydispersity of 2.504, and an acid number of 0.8 mg KOH/gm.

C. Preparation of Coating Composition

A coating is prepared as described in Example 1-C. The properties of the coating prepared from the advanced epoxy ester resin produced in Example 13 are given in Table II.

EXAMPLE 14

A. Description of Epoxy Ester Resin

Epoxy ester resin prepared in Example 5B is evaluated.

B. Preparation of Coating Composition

Thirty (30) grams of the epoxy ester resin is dissolved in 70 grams of solvent mixture. The solvent mixture consists of 35 weight percent of ethylene glycol monobutyl ether, 20 weight percent of cyclohexanone, 25 weight percent of Solvent A, and 20 weight percent of xylene. Curing Agent A (1.57 grams) and 1.57 grams of 10% phosphoric acid (as an accelerator) are blended with the epoxy ester resin solution. The mixture is homogenized for 4 hours at a temperature of 110° C. After cooling to ambient temperature, the resultant coating composition is applied to tin-free steel panels via wire wound bar and cured in an oven at 210° C. for 10 minutes.

EXAMPLE 15

A. Preparation of Advanced Epoxy Resin

Epoxy Resin A (200.00 grams, 1.108 equivalent), Dihydroxyl Containing Compound A (110.24 grams, 0.968 equivalent), and 0.3400 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 2,206 and a Mw of 11,440.

B. Preparation of Epoxy Ester Resin

Stearic acid (12.00 grams, 0.0422 equivalent), Dimerized Fatty Add D (26.19 grams, 0.075 equivalent), and 0.07 grams of Catalyst A are added into the resin kettle to react with the advanced epoxy resin. The contents are heated to a temperature of 195° C. for additional 1 hour. A clear high molecular weight epoxy ester resin is obtained. The final product is taken and analysis reveals it to have an EEW of 9,362, a Mw of 26,740, a polydispersity of 8.330, and an acid number of 6.0 mg KOH/gm.

C. Preparation of Coating Composition

A coating is prepared as described in Example 1-C. The properties of the coating prepared from the advanced epoxy ester resin produced in Example 15 are given in Table II.

EXAMPLE 16

A. Preparation of Polyamide Dicarboxylic Acid Resin

Dimerized Fatty Acid A (415 grams, 1.4706 equivalent), and 4,4'-methylene dianiline (85 grams, 0.4292 equivalent) are added to a 1 liter reaction flask. The contents are heated with stirring and nitrogen purge to 120° C. over a period of 1 hour, and maintained at this temperature for 30 minutes. The contents are then heated to 240° C. over a period of 1 hour, and maintained at this temperature for 2 hours and naturally cooled to room temperature to obtain a polyamide carboxylic acid having an acid value of 70 and an acid equivalent weight of 801.4. The polyamide carboxylic acid is diluted with Solvent A to a solid concentration of 50 percent by weight. Hereinafter the polyamide carboxylic acid solution is referred to as "Solution A" having an acid equivalent weight of 1,602.8.

B. Preparation of Advanced Epoxy Resin

Epoxy Resin A (129.58 grams, 0.718 equivalent), Dihydroxyl Containing Compound A (70.42 grams, 0.618 equivalent), and 0.2221 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW 2,032 and a Mw of 11,900.

C. Preparation of Epoxy Ester Resin

Stearic acid (10.00 grams, 0.0352 equivalent), Solution A (20.00 grams, 0.01248 equivalent), and 0.07 grams of Catalyst A are added into the resin kettle to react with the advanced epoxy resin. The contents are heated to a temperature of 195° C. for additional 1 hour. A clear high molecular weight epoxy ester resin is obtained. The final product is taken and analysis reveals it to have an EEW of 4,778, a Mw of 18,980, a polydispersity of 3.042, and an acid number of 1.0 mg KOH/gm.

D. Preparation of Coating Composition

A coating is prepared as described in Example 1-C. The properties of the coating prepared from the advanced epoxy ester resin produced in Example 16 are given in Table II.

EXAMPLE 17

A. Description of Epoxy Ester Resin

Epoxy ester resin prepared in Example 5B is evaluated.

B. Preparation of Coating Composition

Thirty (30) grams of the epoxy ester resin is dissolved in 70 grams of solvent mixture. The solvent mixture consists of 35 weight percent of ethylene glycol monobutyl ether, 20 weight percent of cyclohexanone, 25 weight percent of Solvent A, and 20 weight percent of xylene. Curing Agent B (2.53 grams) and 1.57 grams of 10% phosphoric acid (as an accelerator) are blended with the epoxy ester resin solution. The mixture is homogenized for 20 hours at a temperature of 60° C. After cooling to ambient temperature, the resultant coating composition is applied to tin-free steel panels via wire wound bar and cured in an oven at 210° C. for 10 minutes.

EXAMPLE 18

A. Description of Epoxy Ester Resin

Epoxy ester resin prepared in Example 5B is evaluated.

B. Preparation of Coating Composition

Thirty (30) grams of the epoxy ester resin is dissolved in 70 grams of solvent mixture. The solvent mixture consists of 35 weight percent of ethylene glycol monobutyl ether, 20 weight percent of cyclohexanone, 25 weight percent of Solvent A, and 20 weight percent of xylene. Curing Agent C (2.53 grams) and 2.08 grams of 10% phosphoric acid (as an accelerator) are blended with the epoxy ester resin solution. The mixture is homogenized for 20 hours at a temperature of 60° C. After cooling to ambient temperature, the resultant coating composition is applied to tin-free steel panels via wire wound bar and cured in an oven at 210° C. for 10 minutes.

COMPARATIVE EXPERIMENT A

1. Preparation of Epoxy Ester Resin

Epoxy Resin B (183.9 grams, 0.200 equivalent), Dimerized Fatty Acid B (28.22 grams, 0.1 equivalent), and 0.14 grams Catalyst A are added to a 1 liter resin kettle equipped with a means for stirring, nitrogen purge, and temperature control. The contents are heated with stirring to a temperature of 195° C. Abrupt increase of viscosity is observed at 1 hour 15 minutes reaction at 195° C. The reaction is stopped by decanting and cooling the resin. A sample is taken and an analysis reveals it to have an EEW of 3,039, a Mw of 66,850, a polydispersity of 17.377, and an acid number of 1.2 mg KOH/mg.

COMPARATIVE EXPERIMENT B

1. Preparation of Advanced Epoxy Resin

Epoxy Resin A (129.58 grams, 0.718 equivalent), Dihydroxyl Containing Compound A (70.42 grams, 0.618 equivalents, and 0.222 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 2,046 and an Mw of 12,250.

2. Preparation of Epoxy Ester Resin

Dimerized Fatty Acid B (11.25 grams, 0.040 equivalent), and 0.07 grams of Catalyst A are added into the resin kettle to react with the advanced epoxy resin. The contents are heated to a temperature of 195° C. Abrupt increase of viscosity and gelation occurs after 25 minutes reaction at 195° C.

COMPARATIVE EXPERIMENT C

1. Preparation of Epoxy Ester Resin

Epoxy Resin A (129.58 grams, 0.718 equivalent), Dihydroxyl Containing Compound A (70.42 grams, 0.618 equivalent), and 0.222 grams of Catalyst A are added to a 1 liter resin kettle equipped with a means for stirring, nitrogen purge, and temperature control. The contents are heated with stirring to a temperature of 170° C. over a period of 30 minutes. A sample is taken and an analysis reveals the advanced epoxy resin to have an EEW of 2,081 and a Mw of 12,580.

Dimerized Fatty Acid B (15.00 grams, 0.053 equivalent) and 0.07 grams of Catalyst A are added into the resin kettle to react with the advanced epoxy resin. The contents are heated to a temperature of 195° C. After 35 minutes reaction, abrupt increase of viscosity is observed and gelation occurs.

COMPARATIVE EXPERIMENT D

1. Preparation of Advanced Epoxy Resin

Epoxy Resin A (153.49 grams, 0.850 equivalent), Dihydroxyl Containing Compound A (46.51 grams, 0.408 equivalent), and 0.222 grams of Catalyst A are added to a 1 liter resin kettle with continuous stirring, nitrogen purge, and temperature control. The contents are heated with stirring to a temperature of 170° C. over a period of 30 minutes. A sample is taken and an analysis reveals the advanced epoxy resin to have an EEW of 465 and a Mw of 1,951.

2. Preparation of Epoxy Ester Resin

Dimerized Fatty Acid B (60.00 grams, 0.213 equivalent), stearic acid (10.00 grams, 0.035 equivalent), and 0.07 grams of Catalyst A are added into the resin kettle to react with the advanced epoxy resin. The contents are heated to a temperature of 195° C. for additional 2 hours. The final resin has an EEW of 1,551, a Mw of 8,038, and a polydispersity of 2.86.

3. Preparation of Coating

A coating is prepared as described in Example 1-C. The properties of the coating prepared from the advanced epoxy ester resin produced in Comparative Experiment D2 are given in Table II.

COMPARATIVE EXPERIMENT E

1. Preparation of Epoxy Ester Resin

Epoxy Resin F (130.00 grams, 0.281 equivalent), stearic acid (52.00 grams, 0.183 equivalent), Dimerized Fatty Acid A (52.00 grams, 0.184 equivalent) are added to a one liter resin kettle equipped with continuous nitrogen purge and temperature control. The contents are heated with stirring to a temperature of 190° C. over a period of 1 hour. Then the temperature is gradually raised up to 215° C. in 1 hour. The mixture is cooled down to 200° C. and temperature was maintained at 200° C. for additional 2 hours. A sample is taken and an analysis revealed the resin to have an acid number of 30 mg KOH/gm, a Mw of 9,540, and a polydispersity of 4.436.

2. Preparation of Coating Composition

A coating is prepared as described in Example 1-C. The properties of the coating prepared from the epoxy ester resin produced in Comparative Experiment E are given in Table II.

COMPARATIVE EXPERIMENT F

2. Preparation of Epoxy Ester Resin

Epoxy Resin F (130.00 grams, 0.281 equivalent), lauric acid (80.00 grams, 0.400 equivalent), Dimerized Fatty Acid A (60.00 grams, 0.212 equivalent), and 20.00 grams of xylene are added to a one liter resin kettle fitted with a Dean and Stark apparatus. The resin kettle is under continuous nitrogen purge and temperature control. The contents are heated with stirring to a temperature of 190° C. over a period of 1 hour. Water is removed as an azeotrope with xylene. After 1 hour reaction, the temperature has risen to 215° C. The mixture is cooled down to 195° C. and temperature is maintained at 190° to 195° C. for additional 2 hours. A sample is taken and an analysis reveals the resin to have an acid number of 64 mg KOH/gm, a Mw of 5,950, and a polydispersity of 3,722.

2. Preparation of Coating Composition

A coating is prepared as described in Example 1-C. The properties of the coating prepared from the advanced epoxy ester resin produced in Comparative Experiment F are given in Table II.

COMPARATIVE EXPERIMENT G

1. Preparation of Epoxy Ester Resin

Epoxy Resin F (130.00 grams, 0.281 equivalent), lauric acid (140.00 grams, 0.700 equivalent), Dimerized Fatty Acid A (180.00 grams, 0.636 equivalent), and 50.00 grams of xylene are added to a one liter resin kettle fitted with a Dean and Stark apparatus. The resin kettle is under continuous nitrogen purge and temperature control. The contents are heated with stirring to a temperature of 190° C. over a period of 1 hour. Water is removed as an azeotrope with xylene. After 1 hour reaction, the temperature has risen to 215° C. The mixture is cooled down to 195° C. and temperature is maintained at 190° to 195° C. for additional 2 hours. A sample is taken and an analysis reveals the resin to have an acid number of 103 mg KOH/gm, a Mw of 5,340, and a polydispersity of 4.240.

2. Preparation of Coating Composition

A coating is prepared as described in Example 1-C. The properties of the coating prepared from the advanced epoxy ester resin produced in Comparative Experiment G are given in Table II.

COMPARATIVE EXPERIMENT H

1. Preparation of Epoxy Ester Resin

Epoxy Resin F (130.00 grams, 0.281 equivalent), stearic acid (60.00 grams, 0.211 equivalent), Dimerized Fatty Acid A (60.00 grams, 0.212 equivalent) are added to a one liter resin kettle equipped with continuous nitrogen purge and temperature control. The contents are heated with stirring to a temperature of 190° C. over a period of 1 hour. Then the temperature is gradually raised up to 215° C. in 1 hour. The mixture is cooled down to 200° C. and temperature is maintained at 200° C. for additional 2 hours. A sample is taken and an analysis reveals the resin to have an acid number of 49 mg KOH/gm, a Mw of 11,505, and a polydispersity of 5.606.

2. Preparation of Coating Composition

A coating is prepared as described in Example 1-C. The properties of the coating prepared from the advanced epoxy ester resin produced in Comparative Experiment H are given in Table II.

COMPARATIVE EXPERIMENT I

1. Preparation of Advanced Epoxy Resin

Epoxy resin A (129.58 grams, 0.718 equivalent), bisphenol A (70.42 grams, 0.618 equivalent), and 0.222 grams of Catalyst A re added to a 1 liter resin kettle equipped with a means for stirring, nitrogen purge, and temperature control. The contents are heated with stirring to a temperature of 170° C. over a period of 30 minutes. A sample was taken and an analysis reveals the advanced epoxy resin to have an EEW 2,184 and a Mw of 13,540.

2. Preparation of Epoxy Ester Resin

Stearic acid (6.00 grams, 0.0211 equivalent), dimerized fatty acid A (25.00 grams, 0.0885 equivalent), and 0.07 grams of Catalyst A are added into the resin kettle to react with the advanced epoxy resin. The contents are heated to a temperature of 195° C. Abrupt increase of viscosity and gelation occurs after 1 hour reaction at 195° C.

COMPARATIVE EXPERIMENT J

1. Preparation of Epoxy Ester Resin

Epoxy resin D (176.70 grams, 0.1 equivalent), Stearic acid (28.38 grams, 0.1 equivalent), dimerized fatty acid A (2.82 grams, 0.01 equivalent), and 0.07 grams of Catalyst A are added to a one liter resin kettle with continuous nitrogen purge and temperature control. The contents are heated with stirring to temperature 180° C. over a time of 1 hour. A sample is taken and an analysis reveals the resin to have an acid number of 29 mg KOH/gm, a MW of 9,023, and a polydispersity of 2.369.

2. Preparation of Coating Composition

A coating is prepared as described in Example 1-C. The properties of the coating prepared from the advanced epoxy ester resin produced in Comparative Experiment J are given in Table II.

TESTS EMPLOYED IN EVALUATION OF COATING COMPOSITIONS

The following tests are employed in evaluating the coating compositions.

Methyl Ethyl Ketone (MEK) Resistance (Test for Solvent Resistance)

The resistance of the cured coating on a cold rolled steel panel to removal with methyl ethyl ketone is determined by rubbing across the baked panels a two pound ball peen hammer with the ball end covered with eight layers of cheesecloth which has been saturated with methyl ethyl ketone. No force is applied to the hammer other than that necessary to guide the hammer back and forth over the same area. A twelve inch ruler clamped into place is used to guide the hammer in the same path. The coated panels after rubbed are dipped into a mixture of 20% CuSO4.5H2O and 10% concentrated hydrochloric acid in water for 30 seconds and then dipped into deionized water to determine breakthrough. A forward and reverse stroke returning to the starting point is considered as being one MEK double rub.

Wedge Bends (Test for Formability or Flexibility)

Wedge bend is used as a measure of the formability of coatings. The coated tin free steel panels are cut to give specimens 4 inches by 2 inches (10.16 cm×5.08 cm). The specimens, coated side down, is placed under the 1/16 inch (0.15875 cm) cylindrical mandrel of a Gardner Impact Tester. The Specimen is slid to the rear of the mandrel platform until the edge is flush with two studs located at the rear of the platform. The remainder of the panel is raised at a uniform velocity to bend the specimen 170 to 180 degree in a time not to exceed 5 seconds. The spacer located under the impact platform is slid to the extreme front of the tester and tighten in place with the adjustment screws provided. This allows the impact platform to create a wedge that provides stress angels between 170 and 180 degrees. The bent specimen is placed under the impact platform. The longest segment of the specimen is placed downward. The specimen is subjected to the impact of the flat end of the impacter rod dropped from a calibrated height of 60 inch-pounds. The bent area is then tested for adhesion by taping with Scotch 610 tape. The tape is pulled with a rapid and forceful fashion from the edge of the most extreme bending at a 90 degree angle in an attempt to pull the coating away from the substrate. The bend is dipped into a solution of copper sulfate (10 grams) in 1.0N hydrochloric acid and then dipped into deionized water. The distance of removed coating from the edge of the most severe bend outward to the edge with the least severe bend is measured in millimeters. Four replicate specimens are tested and averaged.

Water Pasteurization Resistance

Water pasteurization resistance is performed on a single specimen for each coating to determine the permeability of the coating to water with pressure and heat. The coating substrate is tin free steel. The width of each specimen is about 12 centimeters while the length is about 6 centimeters. A mold and the Gardner Impacter Tester are used to form a semi-circular bend in each specimen. The semi-circular bend is used to simulate a stressed area. The dart impacter rod is dropped from 56 inch-pounds for all the specimens when forming the bend. The specimens are then placed in a Model 8100-TD NORCO Autoclave with deionized water for 90 minutes at 121° C. (250° F.) and 1 bar (15 psi) pressure. The clock is only started after both the desired temperature and pressure are reached. After the specimens are pasteurized for the prescribed conditions, the heat is turned off, the pressure bled off and the panels removed for testing. The coated specimens are submerged in deionized water after removal from the autoclave. The specimens are blotted dry after removal from the water with a paper towel. They are rated for blush and adhesion. The tested coatings are rated for blush by placing the specimens next to the panels from which the specimens are cut. The coatings are rated for blush according to the following scale:

| Rating | Description |
|---|---|
| B1 | No blush |
| B2 | Dull, loss of luster |
| B3 | Total loss of luster |
| B4 | Blush, small areas white or cloudy, starting to loose transparency |
| B5 | ⅛ to ½ of panel cloudy, expanded coating, few bubbles |
| B6 | No longer clear, whole specimen is white, rough surface, bubbles |
| B7 | Very rough or cracked surface, many bubbles |

Adhesion is determined by using the tape test described in method A of ASTM 3359 (1987). The tape is Scotch 610 tape. X-cuts are made in the stressed and non-stressed areas of each specimen. The adhesion of the non-stressed specimen is listed first while the adhesion in the stressed area is listed second. The coatings are listed for adhesion according to the following scale.

| Rating | Description |
|---|---|
| 5A | No peeling or removal |
| 4A | Trace peeling or removal along incisions |
| 3A | Jagged removal along most of the incisions up to 1/16 inch (1.6 mm) on either side |
| 2A | Jagged removal along most of the incisions up to ⅛ inch |

| Rating | Description |
|---|---|
| | (3.2 mm) on either side |
| 1A | Removal from most of the area of the X under the tape |
| 0A | Removal beyond the area of the X |

The following Table I summarizes the epoxy resin esters prepared in Examples 1-14 and Comparative Experiments A-H.

TABLE II

Test Results of Examples and Comparative Experiments.

| | MEK Double Rub | Wedge Bend | Blush[a] | Adhesion Unstressed[a] | Adhesion Stressed[a] |
|---|---|---|---|---|---|
| Ex. 1 | 15 | 8.2 | B1 | 5A | 5A |
| Ex. 2 | 15 | 6.7 | B1 | 5A | 5A |
| Ex. 3 | 25 | 1.7 | B1 | 5A | 5A |
| Ex. 4 | 15 | 5.2 | B1 | 5A | 5A |
| Ex. 5 | 20 | 2.2 | B1 | 5A | 5A |

TABLE I

| | Epoxy | | | Dimer Acid | | | | | Mono Acid | |
|---|---|---|---|---|---|---|---|---|---|---|
| | EEW | Mw | grams | Acid Eq. Wt. | Total grams | Dimer grams | Trimer grams | Mono grams | Acid Equiv. Wt. | grams |
| Ex. 1 | 1,792 | 10,760 | 200 | 282.2 | 11.88 | 11.405 | 0.238 | 0.238 | 283.75 | 9.08 |
| Ex. 2 | 2,105 | 13,310 | 200 | 281.9 | 7.5 | 7.275 | 0 | 0.075 | 283.75 | 7.5 |
| Ex. 3 | 2,608 | 15,451 | 200 | 281.9 | 4 | 3.88 | 0 | 0.04 | 283.75 | 4 |
| Ex. 4 | 2,046 | 12,250 | 200 | 281.9 | 11.25 | 10.913 | 0 | 0.112 | 283.75 | 3.75 |
| Ex. 5 | 1,641 | 9,665 | 200 | 282.2 | 18.54 | 17.798 | 0.371 | 0.371 | 283.75 | 6.38 |
| Ex. 6 | 1,513 | 8,920 | 200 | 282.2 | 17.32 | 16.627 | 0.346 | 0.346 | 283.75 | 7.12 |
| Ex. 7 | 1,212 | 7,070 | 200 | 282.2 | 27.6 | 26.496 | 0.552 | 0.552 | 283.75 | 5.26 |
| Ex. 8 | 920 | 4,348 | 183.9 | 281.9 | 28.22 | 27.373 | 0 | 0.282 | 283.75 | 8 |
| Ex. 9 | 1,842 | 10,070 | 746 | 282.2 | 42 | 40.32 | 0.84 | 0.84 | 200 | 8.4 |
| Ex. 10 | 1,448 | 8,250 | 200 | 282.2 | 17.32 | 16.627 | 0.346 | 0.346 | 283.75 | 7.12 |
| Ex. 11 | 2,049 | 12,180 | 200 | 282.6 | 5 | 3.85 | 0.55 | 0.6 | 283.75 | 10 |
| Ex. 12 | 1,526 | 8,486 | 200 | 282.2 | 18.4 | 17.664 | 0.368 | 0.368 | 283.75 | 6 |
| Ex. 13 | 1,547 | 6,525 | 200 | 282.2 | 18.4 | 17.664 | 0.368 | 0.368 | 283.75 | 6 |
| Ex. 14 | 1,641 | 9,665 | 200 | 282.2 | 18.54 | 17.798 | 0.371 | 0.371 | 283.75 | 6.38 |
| Ex. 15 | 2,206 | 11,440 | 310.2 | 348.5 | 26.19 | 25.929 | 0.262 | 0.026 | 283.75 | 12 |
| Ex. 16 | 2,032 | 11,900 | 200 | 801.4 | 10 | 9.6 | 0.2 | 0.2 | 283.75 | 10 |
| Ex. 17 | 1,641 | 9,665 | 200 | 282.2 | 18.54 | 17.798 | 0.371 | 0.371 | 283.75 | 6.38 |
| Ex. 18 | 1,641 | 9,665 | 200 | 282.2 | 18.54 | 17.798 | 0.371 | 0.371 | 283.75 | 6.38 |
| CE. A* | 920 | 4,348 | 183.9 | 281.9 | 28.22 | 27.373 | 0 | 0.282 | 283.75 | 0 |
| CE. B* | 2,046 | 12,250 | 200 | 281.9 | 11.25 | 10.913 | 0 | 0.112 | 283.75 | 0 |
| CE. C* | 2,081 | 12,580 | 200 | 281.9 | 15 | 14.55 | 0 | 0.15 | 283.75 | 0 |
| CE. D* | 465 | 1,951 | 200 | 281.9 | 60 | 58.2 | 0 | 0.6 | 283.75 | 10 |
| CE. E* | 462 | 1,975 | 130 | 282.2 | 52 | 49.92 | 1.04 | 1.04 | 283.75 | 52 |
| CE. F* | 462 | 1,975 | 130 | 282.2 | 60 | 57.6 | 1.2 | 1.2 | 200 | 80 |
| CE. G* | 462 | 1,975 | 130 | 282.2 | 180 | 172.8 | 3.6 | 3.6 | 200 | 140 |
| CE. H* | 462 | 1,975 | 130 | 282.2 | 60 | 57.6 | 1.2 | 1.2 | 283.75 | 60 |
| CE. I* | 2184 | 13,540 | 200 | 282.2 | 25 | 24 | 0.5 | 0.5 | 283.75 | 6 |
| CE. J* | 1767 | 7835 | 177 | 282.2 | 2.82 | 2.71 | 0.06 | 0.06 | 283.75 | 28.4 |

| | EQUIVALENTS | | | | | RATIO | | | Average Acid Funct. | f + g + h | Ester EEW | Ester Mw | Ester Acid # | Ester Mw/Mn |
|---|---|---|---|---|---|---|---|---|---|---|---|---|---|---|
| | EPOXY | ACID Dimer | Dimer Acid Trimer | Mono | Mono Acid | Ep | f | g | h | | | | | | |
| Ex. 1 | 0.1116 | 0.0404 | 0.0008 | 0.0008 | 0.0320 | 1 | 0.362 | 0.008 | 0.294 | 1.57 | 0.66 | 6,573 | 24,950 | 1 | 2.902 |
| Ex. 2 | 0.0950 | 0.0258 | 0.0000 | 0.0003 | 0.0264 | 1 | 0.272 | 0.000 | 0.281 | 1.49 | 0.55 | 3,486 | 15,750 | 1.4 | 3.2 |
| Ex. 3 | 0.0767 | 0.0138 | 0.0000 | 0.0001 | 0.0141 | 1 | 0.179 | 0.000 | 0.186 | 1.49 | 0.37 | 5,673 | 34,780 | 0.3 | 3.181 |
| Ex. 4 | 0.0978 | 0.0387 | 0.0000 | 0.0004 | 0.0132 | 1 | 0.396 | 0.000 | 0.139 | 1.74 | 0.54 | 4,768 | 25,680 | 0.4 | 2.95 |
| Ex. 5 | 0.1219 | 0.0631 | 0.0013 | 0.0013 | 0.0225 | 1 | 0.517 | 0.011 | 0.195 | 1.75 | 0.72 | 8,058 | 57,910 | 1.6 | 5.385 |
| Ex. 6 | 0.1322 | 0.0589 | 0.0012 | 0.0012 | 0.0251 | 1 | 0.446 | 0.009 | 0.199 | 1.71 | 0.65 | 5,829 | 30,495 | 0.9 | 3.418 |
| Ex. 7 | 0.1650 | 0.0939 | 0.0020 | 0.0020 | 0.0185 | 1 | 0.569 | 0.012 | 0.124 | 1.84 | 0.71 | 4,926 | 34,710 | 1.6 | 3.676 |
| Ex. 8 | 0.2000 | 0.0971 | 0.0000 | 0.0010 | 0.0282 | 1 | 0.486 | 0.000 | 0.146 | 1.77 | 0.63 | 4,614 | 41,638 | 1.9 | 9.227 |
| Ex. 9 | 0.4050 | 0.1429 | 0.0030 | 0.0030 | 0.0420 | 1 | 0.353 | 0.007 | 0.111 | 1.78 | 0.47 | 3,509 | 15,554 | 1 | 2.274 |
| Ex. 10 | 0.1381 | 0.0589 | 0.0012 | 0.0012 | 0.0251 | 1 | 0.427 | 0.009 | 0.191 | 1.71 | 0.63 | 4,702 | 27,160 | 0.8 | 3.899 |
| Ex. 11 | 0.0976 | 0.0136 | 0.0019 | 0.0021 | 0.0352 | 1 | 0.140 | 0.020 | 0.383 | 1.33 | 0.54 | 5,873 | 19,364 | 1.2 | 2.837 |
| Ex. 12 | 0.1311 | 0.0626 | 0.0013 | 0.0013 | 0.0211 | 1 | 0.478 | 0.010 | 0.171 | 1.76 | 0.66 | 5,619 | 22,631 | 1 | 2.659 |
| Ex. 13 | 0.1293 | 0.0626 | 0.0013 | 0.0013 | 0.0211 | 1 | 0.484 | 0.010 | 0.174 | 1.76 | 0.67 | 6,017 | 15,345 | 1.2 | 2.504 |
| Ex. 14 | 0.1219 | 0.0631 | 0.0013 | 0.0013 | 0.0225 | 1 | 0.517 | 0.011 | 0.195 | 1.75 | 0.72 | 8,058 | 57,910 | 1.6 | 5.385 |
| Ex. 15 | 0.1406 | 0.0744 | 0.0008 | 0.0001 | 0.0423 | 1 | 0.529 | 0.005 | 0.301 | 1.65 | 0.84 | 9,362 | 26,740 | 6 | 8.33 |
| Ex. 16 | 0.0984 | 0.0120 | 0.0002 | 0.0002 | 0.0352 | 1 | 0.122 | 0.003 | 0.361 | 1.26 | 0.48 | 4,778 | 18,980 | 1 | 3.042 |
| Ex. 17 | 0.1219 | 0.0631 | 0.0013 | 0.0013 | 0.0225 | 1 | 0.517 | 0.011 | 0.195 | 1.75 | 0.72 | 8,058 | 57,910 | 1.6 | 5.385 |
| Ex. 18 | 0.1219 | 0.0631 | 0.0013 | 0.0013 | 0.0225 | 1 | 0.517 | 0.011 | 0.195 | 1.75 | 0.72 | 8,058 | 57,910 | 1.6 | 5.385 |
| CE. A* | 0.2000 | 0.0971 | 0.0000 | 0.0010 | 0.0000 | 1 | 0.486 | 0.000 | 0.005 | 1.99 | 0.49 | 3,039 | 66,850 | 1.2 | 17.377 |
| CE. B* | 0.0978 | 0.0387 | 0.0000 | 0.0004 | 0.0000 | 1 | 0.396 | 0.000 | 0.004 | 1.99 | 0.40 | Gel | Gel | Gel | Gel |
| CE. C* | 0.0961 | 0.0516 | 0.0000 | 0.0005 | 0.0000 | 1 | 0.537 | 0.000 | 0.006 | 1.99 | 0.54 | Gel | Gel | Gel | Gel |
| CE. D* | 0.4301 | 0.2065 | 0.0000 | 0.0021 | 0.0352 | 1 | 0.480 | 0.000 | 0.087 | 1.85 | 0.57 | 1,551 | 8,038 | 2 | 2.86 |
| CE. E* | 0.2814 | 0.1769 | 0.0037 | 0.0037 | 0.1833 | 1 | 0.629 | 0.013 | 0.664 | 1.50 | 1.31 | N.D.[b] | 9,540 | 30 | 4.436 |
| CE. F* | 0.2814 | 0.2041 | 0.0043 | 0.0043 | 0.4000 | 1 | 0.725 | 0.015 | 1.437 | 1.35 | 2.18 | N.D.[b] | 5,950 | 64 | 3.722 |
| CE. G* | 0.2814 | 0.6123 | 0.0128 | 0.0128 | 0.7000 | 1 | 2.176 | 0.045 | 2.533 | 1.48 | 4.75 | N.D.[b] | 5,340 | 103 | 4.24 |
| CE. H* | 0.2814 | 0.2041 | 0.0043 | 0.0043 | 0.2115 | 1 | 0.725 | 0.015 | 0.767 | 1.50 | 1.51 | N.D.[b] | 11,505 | 49 | 5.606 |
| CE. I* | 0.0916 | 0.0850 | 0.0018 | 0.0002 | 0.0211 | 1 | 0.929 | 0.019 | 0.233 | 1.82 | 1.18 | Gel | Gel | Gel | Gel |
| CE. J* | 0.1000 | 0.0096 | 0.0002 | 0.0002 | 0.1000 | 1 | 0.096 | 0.002 | 1.002 | 1.09 | 1.10 | 2,403 | 9,023 | 29 | 2.39 |

*Not an example of the present invention.
[a]Equivalent ratio of epoxy/dimer acid/monocarboxylic acid
[b]Not Determined.

TABLE II-continued

Test Results of Examples and Comparative Experiments.

| | MEK Double Rub | Wedge Bend | Blush[a] | Adhesion Unstressed[a] | Adhesion Stressed[a] |
|---|---|---|---|---|---|
| Ex. 6 | 20 | 5.2 | B1 | 5A | 5A |
| Ex. 7 | 15 | 7.5 | B1 | 5A | 5A |
| Ex. 8 | 15 | 8 | B1 | 5A | 5A |
| Ex. 9 | 15 | 3.5 | B1 | 5A | 5A |
| Ex. 10 | 15 | 8 | B1 | 5A | 5A |
| Ex. 11 | 15 | 7.2 | B1 | 5A | 5A |
| Ex. 12 | 15 | 7 | B1 | 5A | 5A |
| Ex. 13 | 15 | 8.7 | B1 | 5A | 5A |
| Ex. 14 | 30 | 7.6 | B1 | 5A | 5A |
| Ex. 15 | 15 | 3.2 | B1 | 5A | 5A |
| Ex. 16 | 15 | 5.8 | B1 | 5A | 5A |
| Ex. 17 | 20 | 1 | B1 | 5A | 5A |
| Ex. 18 | 50 | 0 | B1 | 5A | 5A |
| C.E. D* | <5 | 43.3 | B2 | 5A | 5A |
| C.E. E* | <5 | 26.5 | B1 | 4A | 4A |
| C.E. F* | <5 | 17.5 | B1 | 5A | 5A |
| C.E. G* | <5 | 13.2 | B1 | 5A | 5A |
| C.E. H* | <5 | 14 | B1 | 5A | 5A |
| C.E. J* | <5 | 38.2 | B2 | 5A | 5A |

*Not an example of the present invention.
[a]Water pasteurization test.

What is claimed is:

1. An esterified epoxy resin having an acid number from zero to about 16, a polydispersity value of less than about 10 which results from reacting at a temperature of from about 170° C. to about 280° C.

(A) an epoxy resin having an epoxide equivalent weight of from 600 to about 15,000 being essentially free of castor oil polyglycidyl ether;
    (B) a dimerized fatty acid having from about 10 to about 100 carbon atoms per molecule;
    (C) optionally, a trimerized fatty acid having from 20 to about 150 carbon atoms per molecule; and
    (D) a monocarboxylic acid; and wherein components (A), (B), (C) and (D) are employed in amounts which provide a ratio of epoxide equivalents from component (A) to carboxylic acid equivalents from component (B) to carboxylic acid equivalents from component (C) to carboxylic acid equivalents from component (D) of 1:f:g:h, wherein f is the carboxylic acid equivalents from component (B) and has a value from about 0.1 to about 0.9; g is the carboxylic acid equivalents from component (C) and has a value from zero to about 0.1; and h is the carboxylic acid equivalents from component (D) and has a value of from about 0.05 to about 0.9; the value of f+g+h has a value from about 0.11 to less than 0.99; and 1.05<average acid functionality<1.95, where average acid functionality is ((2f+3g+h)/(f+g+h)).

2. An esterified epoxy resin of claim 1 wherein
    (a) component (A) is an epoxy resin having an epoxide equivalent weight of from about 750 to about 8,000;
    (b) f has a value from about 0.12 to about 0.75;
    (c) g has a value from zero to about 0.05;
    (d) h has a value from about 0.05 to about 0.65;
    (e) the value of f+g+h is from about 0.2 to about 0.9;
    (f) 1.2<average acid functionality<1.9; and
    (e) said esterified epoxy resin has an acid number of from about 0.01 to about 10.

3. An esterified epoxy resin of claim 1 wherein
    (a) component (A) is an epoxy resin having an epoxide equivalent weight of from about 900 to about 5,000; and
    (b) f has a value from about 0.15 to about 0.55;
    (c) g has a value from zero to about 0.02;
    (d) h has a value from about 0.1 to about 0.4;
    (e) the value of f+g+h is from about 0.35 to about 0.85;
    (f) 1.3<average acid functionality<1.85; and
    (g) said esterified epoxy resin has an acid number of from about 0.1 to about 6.

4. An esterified epoxy resin of claim 3 wherein
    (a) component (A) is a diglycidyl ether of a dihydric bisphenol or a diglycidyl ether of a polyoxyalkylene glycol or a combination thereof;
    (b) component (B) is a dimerized fatty acid having from 24 to about 48 carbon atoms; and
    (c) component (C) is a monocarboxylic acid having from 4 to about 28 carbon atoms.

5. An esterified epoxy resin of claim 4 wherein
    (a) component (A) is a diglycidyl ether of a bisphenol A or a diglycidyl ether of a polyoxypropylene glycol or a combination thereof;
    (b) component (B) is a $C_{36}$ dibasic fatty acid, a $C_{44}$ dibasic fatty acid, a polyamide dicarboxylic acid, or any combination thereof; and
    (c) component (C) is stearic acid, lauric acid, myristic acid, palmitic acid, oleic acid, linoleic acid, or any combination thereof.

6. A process for the preparation of esterified epoxy resins which comprises reacting at a temperature of from about 170° C. to about 280° C. for a time suitable for producing an esterified epoxy resin having an acid number from zero to about 16, a composition comprising
    (A) an epoxy resin having an epoxide equivalent weight of from 600 to about 15,000 being essentially free of castor oil polyglycidyl ether;
    (B) a dimerized fatty acid having from about 10 to about 100 carbon atoms per molecule;
    (C) optionally, a trimerized fatty acid having from 20 to about 150 carbon atoms per molecule; and
    (D) a monocarboxylic acid; and wherein components (A), (B), (C) and (D) are employed in amounts which provide a ratio of epoxide equivalents from component (A) to carboxylic acid equivalents from component (B) to carboxylic acid equivalents from component (C) to carboxylic acid equivalents from component (D) of 1:f:g:h, wherein f is the carboxylic acid equivalents from component (B) and has a value from about 0.1 to about 0.9; g is the carboxylic acid equivalents from component (C) and has a value from zero to about 0.1; and h is the carboxylic acid equivalents from component (D) and has a value of from about 0.05 to about 0.9, preferably from about 0.05 to about 0.65, more preferably from about 0.1 to about 0.4; the value of f+g+h has a value from about 0.11 to less than 0.99; and 1.05<average acid functionality<1.95, where average acid functionality is ((2f+3g+h)/(f+g+h)).

7. A process of claim 6 wherein
    (a) component (A) is an epoxy resin having an epoxide equivalent weight of from about 750 to about 8,000;
    (b) f has a value from about 0.12 to about 0.75;
    (c) g has a value from zero to about 0.05;
    (d) h has a value from about 0.05 to about 0.65;
    (e) the value of f+g+h is from about 0.2 to about 0.9;
    (f) 1.2<average acid functionality<1.9; and
    (g) the reaction temperature is from about 150° C. to about 250° C.

8. A process of claim 6 wherein (a) component (A) is an epoxy resin having an epoxide equivalent weight of from about 900 to about 5,000;
(b) f has a value from about 0.15 to about 0.55;
(c) g has a value from zero to about 0.02;
(d) h has a value from about 0.1 to about 0.4;
(e) the value of f+g+h is from about 0.35 to about 0.85;
(f) 1.3 < average acid functionality < 1.85; and
(g) the reaction temperature is from about 170° C. to about 230° C.

9. A process of claim 8 wherein
(a) component (A) is a diglycidyl ether of a dihydric bisphenol or a diglycidyl ether of a polyoxyalkylene glycol or a combination thereof;
(b) component (B) is a dimerized fatty acid having from 24 to about 48 carbon atoms; and
(c) component (C) is a monocarboxylic acid having from 4 to about 28 carbon atoms.

10. A process of claim 9 wherein
(a) component (A) is a diglycidyl ether of a bisphenol A or a diglycidyl ether of a polyoxypropylene glycol or a combination thereof;
(b) component (B) is a $C_{36}$ dibasic acid, or a $C_{44}$ dibasic acid, a polyamide dicarboxylic acid, or any combination thereof; and
(c) component (C) is stearic add, lauric acid, myristic acid, palmitic acid, oleic add, linoleic acid, or any combination thereof.

11. A curable composition comprising
(I) an epoxy ester resin having an acid number from zero to about 16, a polydispersity value of less than about 10 which results from reacting at a temperature of from about 170° C. to about 280° C.
(A) an epoxy resin having an epoxide equivalent weight of from 600 to about 15,000 being essentially free of castor oil polyglycidyl ether;
(B) a dimerized fatty acid having from about 10 to about 100 carbon atoms per molecule;
(C) optionally, a trimerized fatty acid having from 20 to about 150 carbon atoms per molecule; and
(D) a monocarboxylic acid; and
wherein components (A), (B), (C) and (D) are employed in amounts which provide a ratio of epoxide equivalents from component (A) to carboxylic acid equivalents from component (B) to carboxylic acid equivalents from component (C) to carboxylic acid equivalents from component (D) of 1:f:g:h,
wherein f is the carboxylic acid equivalents from component (B) and has a value from about 0.1 to about 0.9; g is the carboxylic acid equivalents from component (C) and has a value from zero to about 0.1; and h is the carboxylic acid equivalents from component (D) and has a value of from about 0.05 to about 0.9, preferably from about 0.05 to about 0.65, more preferably from about 0.1 to about 0.4; the value of f+g+h has a value from about 0.11 to less than 0.99; and 1.05 < average acid functionality < 1.95, where average acid functionality is ((2f+3g+h)/(f+g+h)); and
(II) a curing amount of a suitable curing agent for component (I).

12. A curable composition of claim 11 wherein
(a) component (A) is an epoxy resin having an epoxide equivalent weight of from about 750 to about 8,000;
((b) f has a value from about 0.12 to about 0.75;
(c) g has a value from zero to about 0.05;
(d) h has a value from about 0.05 to about 0.65;
(e) the value of f+g+h is less from about 0.2 about 0.9;
(f) 1.2 < average acid functionality < 1.9; and
(g) said esterified epoxy resin has an acid number of from about 0.01 to about 10.

13. A curable composition of claim 12 wherein
(a) component (A) is an epoxy resin having an epoxide equivalent weight of from about 900 to about 5,000; and
(b) f has a value from about 0.15 to about 0.55;
(c) g has a value from zero to about 0.02;
(d) h has a value from about 0.1 to about 0.4;
(e) the value of f+g+h is from about 0.35 to about 0.85
(f) 1.3 < average acid functionality < 1.85; and
(g) said esterified epoxy resin has an acid number of from about 0.1 to about 6.

14. A curable composition of claim 13 wherein
(a) component (A) is a diglycidyl ether of a dihydric bisphenol or a diglycidyl ether of a polyoxyalkylene glycol or a combination thereof;
(b) component (B) is a dimerized fatty acid having from 24 to about 48 carbon atoms;
(c) component (C) is a monocarboxylic acid having from 4 to about 28 carbon atoms; and
(d) component II is a phenol resol resin, urea-aldehyde resin, melamine-aldehyde resin or any combination thereof.

15. A curable composition of claim 14 wherein
(a) component (A) is a diglycidyl ether of a bisphenol A or a diglycidyl ether of a polyoxypropylene glycol or a combination thereof;
(b) component (B)is a $C_{36}$ dibasic fatty acid, a $C_{44}$ dibasic fatty acid, a polyamide dicarboxylic acid, or any combination thereof;
(c) component (C) is stearic acid, lauric acid, myristic acid, palmitic acid, oleic acid, linoleic acid, or any combination thereof; and
(d) component II is an allyl ether of mono-, di- or tri-methylol phenol resin, hexamethoxymethyl melamine, isobutylated urea-formaldehyde resin or any combination thereof.

16. The product resulting from curing the curable composition of claim 11.

17. The product resulting from curing the curable composition of claim 12.

18. The product resulting from curing the curable composition of claim 13.

19. The product resulting from curing the curable composition of claim 14.

20. The product resulting from curing the curable composition of claim 15.

* * * * *